United States Patent
Graham et al.

(10) Patent No.: US 8,573,111 B2
(45) Date of Patent: *Nov. 5, 2013

(54) ACTIVE IMPLEMENT DOWN FORCE SYSTEM WITH AUTOMATIC LATCHING OF TRACTOR POWER BEYOND PRESSURE

(75) Inventors: William Douglas Graham, East Moline, IL (US); Aaron L. Barfels, Davenport, IA (US)

(73) Assignee: Deere & Company, Moline, IL (US)

( * ) Notice: Subject to any disclaimer, the term of this patent is extended or adjusted under 35 U.S.C. 154(b) by 842 days.

This patent is subject to a terminal disclaimer.

(21) Appl. No.: 12/762,663

(22) Filed: Apr. 19, 2010

(65) Prior Publication Data

US 2011/0253239 A1 Oct. 20, 2011

(51) Int. Cl.
F15B 13/04 (2006.01)
F16D 31/02 (2006.01)

(52) U.S. Cl.
USPC ............... 91/447; 91/31; 91/451; 60/445

(58) Field of Classification Search
USPC ........ 91/31, 420, 446, 447, 451, 453; 60/445; 172/2
See application file for complete search history.

(56) References Cited

U.S. PATENT DOCUMENTS

| | | | |
|---|---|---|---|
| 5,065,681 A | 11/1991 | Hadley | |
| 5,687,798 A | 11/1997 | Henry et al. | |
| 6,000,315 A | 12/1999 | Graham et al. | |
| 6,318,477 B1 | 11/2001 | Bettin | |
| 6,460,623 B1 | 10/2002 | Knussman et al. | |
| 7,918,285 B1 * | 4/2011 | Graham et al. | 172/2 |
| 8,056,465 B2 * | 11/2011 | Carlz | 91/447 |
| 2010/0078185 A1 | 4/2010 | Carlz | |

FOREIGN PATENT DOCUMENTS

DE 19646449 5/1998

OTHER PUBLICATIONS

European Search Report received Aug. 2, 2011 (4 pages).

* cited by examiner

*Primary Examiner* — Michael Leslie

(57) ABSTRACT

A load sense connection is provided between the implement rockshaft cylinders and the load-sensed power source. However, to avoid tractor starting difficulty, a valve structure is provided in the power beyond fluid line to keep the fluid line closed when starting the tractor. This valve structure provides a hydraulic latching function that allows the load-sensed power source to be activated and deactivated depending on the SCV function. The load-sensed power source is activated when the rockshaft cylinder(s) is fully extended and remains activated or latched when the SCV is returned to neutral. The load-sensed power source is deactivated or unlatched when the rockshaft cylinder is retracted.

12 Claims, 2 Drawing Sheets

ACTIVE IMPLEMENT DOWN FORCE SYSTEM WITH AUTOMATIC LATCHING OF TRACTOR POWER BEYOND PRESSURE

FIELD OF THE INVENTION

The present invention relates generally to agricultural implements and, more specifically, to an active down force system with a hydraulic circuit that reduces heat buildup and minimizes fuel consumption.

BACKGROUND OF THE INVENTION

Agricultural tractor hydraulic systems which operate high capacity equipment typically generate a considerable amount of heat which must be dissipated. For example, an implement such as a large seeding tool with a hydraulically driven fan often includes an active hydraulic down force system which operates simultaneously with the fan. Many tractors include an additional output port, often referred to as a power beyond pressure port, which is connected to the hydraulically powered components on the implement, to provide additional hydraulic capacity.

During activation of the down force system, the hydraulic circuit must run in a high pressure standby condition. The selective control valve on the tractor is moved to an active position, such as the lower position, and as the down pressure control valve adjusts pressure to the implement cylinders the hydraulic pump receives a signal from the system indicating a stalled condition. The stall signal causes the pump to run at the high pressure condition which requires more power and generates more heat. When a large flow of oil is required by the implement, such as required by the fan, during the high pressure standby condition a large amount of hydraulic energy must be dissipated by valves in the system. This energy dissipation generates a large amount of heat energy. Under certain extreme temperature conditions, tractors with marginal hydraulic cooling systems may overheat.

A partial solution is provided in U.S. Patent Publication US2010/0078185, commonly assigned with the present application and hereby incorporated by reference. There, additional valve components are configured into the active down force circuit to cause the tractor hydraulic system to operate below the stall or high pressure standby condition. A check valve connects the tractor power beyond supply line to the pressure reduction valve that is connected to the implement cylinder ends and controls down pressure. The tractor selective control valve (SCV) is then operated at load pressure in the float mode when the down force circuit is controlling implement down pressure. The circuit eliminates a stall signal to the hydraulic pump that otherwise would cause the pump to rise to the high, heat-producing stall pressure when operating in the active pressure mode. During implement lift, a check valve allows hydraulic flow from the cylinders to bypass the pressure reduction valve. The system therefore operates at lower pressure and lower power to produce less heat and increase fuel economy.

A load sensing system keeps the system pressure at the lowest possible level. The power beyond system provides an external load sense option. However, the power beyond system does not allow the operator to control its output. There is a need to supply an externally load-sensed pressure to the system while allowing the system to be controlled by a non-externally load-sensed selective control valve. To prevent load-sensed pressure from commanding pump flow during tractor engine startup, thus creating tractor starting issues under certain circumstances, it is necessary to prevent load sense signal pressure from being communicated to the tractor during engine startup. This could be done with an electric solenoid valve but an electric signal would have to be present and made available to the circuit. A method to accomplish activation and deactivation of the down force is needed that does not require an electrical signal. Since not all tractors are equipped with power beyond, it is also necessary to be able to operate the rockshaft cylinders and a down force circuit normally, without attaching to power beyond supply, power beyond return, or load sense lines to the circuit.

SUMMARY OF THE INVENTION

A load sense connection is provided between the implement rockshaft cylinders and the load-sensed power source. However, to avoid tractor starting difficulty, a valve structure is provided in the power beyond fluid line to keep the fluid line closed when starting the tractor. This valve structure provides a hydraulic latching function that allows the load-sensed power source to be activated and deactivated depending on the SCV function. The load-sensed power source is activated when the rockshaft cylinder(s) is actuated in one direction, either extend or retract, and remains activated, or latched, when the SCV is returned to neutral. The load-sensed power source is deactivated or unlatched when the rockshaft cylinder is subsequently actuated in the opposite direction, either retract or extend.

DESCRIPTION OF THE PREFERRED EMBODIMENT

Figure 1:
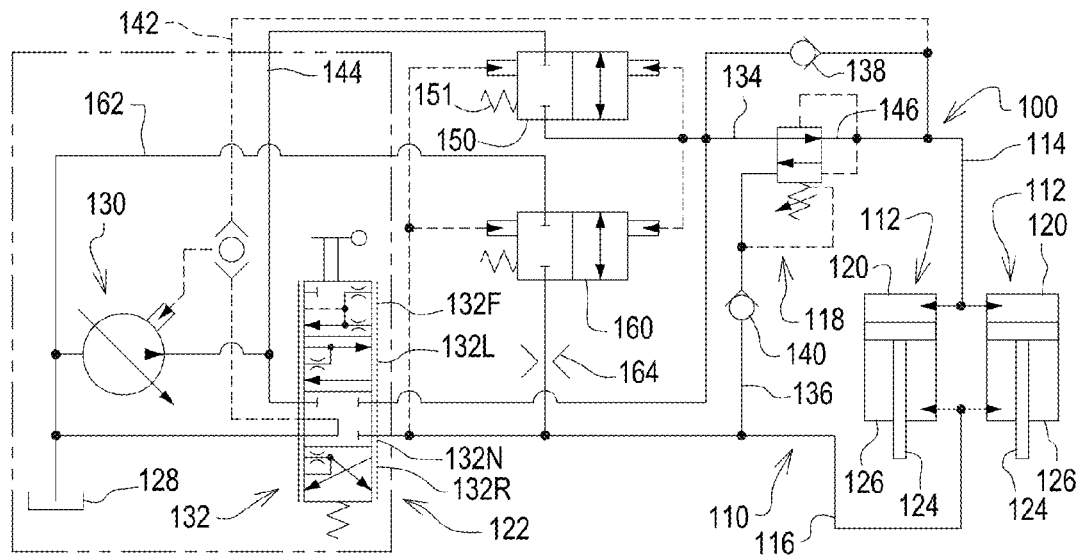
FIG. 1 is an exemplary hydraulic circuit diagram showing one implementation of the present invention.

Referring to FIG. 1, a hydraulic circuit 100 is shown which includes a pair of tool lift and down pressure cylinders 112 connected in parallel by lines 114 and 116. While two cylinders are shown, it will be understood that any number of cylinders can be used. The cylinders are used to raise and lower the tools as well as to provide automatically controlled down pressure to the associated tools, either directly or through a rockshaft (not shown). The hydraulic circuit 100 includes an adjustable pressure valve in the form of a pressure reducing/relieving valve 118 which regulates the pressure delivered to the cap end 120 of the cylinders 112. A tractor 122 includes a source of hydraulic fluid under pressure, a load sense controlled pump 130, connected through a tractor selective control valve (SCV) 132 to inputs 134 and 136 of the pressure reducing/relieving valve 118. The valve 118 further has an output 146 connected to the line 114. The pump 130 provides flow to the SCV 132 which controls the extending and retracting of the rods 124 of the cylinders 112. The SCV has four positions, a neutral position 132N, a tool lower position 132L, a tool raise position 132R and a float position 132F. A return check valve 138 allows flow to bypass the reducing/relieving valve 118 during cylinder retraction. A drain check valve 140 protects the pressure reducing/relieving valve 118 during cylinder retraction.

The active down force pressure load is communicated to the load sense controlled pump 130 by load sense line 142. Fluid pressure for the active down force is provided through the fluid line 144 connecting the pump power beyond port to the input 134 of the pressure reducing/relieving valve 118. Two dual-pilot-operated, two-way, two-position, normally closed, directional valves 150 and 160 provide a hydraulic latching function to the circuit. These valves may be combined into one dual-pilot-operated, four-way, two position valve. The directional valve 150 is positioned in the fluid line 144 while the valve 160 is provided in the power beyond fluid return line 162. Thus, the valve 150 forms a valve means in the fluid line 144 for opening and closing the fluid line 144 to the fluid flow. When the cylinders 112 are fully extended, the cap end supply pressure increases. This pressure pilots the directional valves 150, 160 open, connecting the power beyond pressure to the pressure reducing/relieving valve 118 and the power beyond return port to the rod ends 126 of the cylinders. When the SCV 132 is returned to the neutral/closed position, the directional valves 150, 160 remain open. This allows the cylinders to extend and retract as the external load on the tools require and as the down force pressure allows.

When the SCV is actuated to retract the cylinders, the orifice 164 prevents a free flow of the supply oil through the directional valve 160 to the power beyond return. This allows the pressure in the retract circuit to build enough pressure to pilot the directional valves 150, 160 closed. During cylinder retraction, the cylinder extend circuit is also connected to tank 128 which drops the opening pilot pressure in the directional valves 150, 160, allowing the spring and retract supply pilot pressure to close the directional valves 150, 160. When the SCV is moved to the float position, the directional valves 150, 160 pilot pressures equalize, allowing the springs to close the directional valves 150, 160, thus deactivating the down force circuit.

The above circuit, by adding the normally closed directional valve 150 prevents any pressure from building at the cylinder cap end during starting of the tractor 122. The spring 151 biases the valve 150 to the closed position to close the fluid line 144. Thus there is no load communicated to the pump during starting of the tractor 122 that could possibly cause starting difficulties discussed above. Furthermore, the circuit allows a load-sensed power source, the pump 130, to be activated and deactivated depending on the SCV position. The load-sensed power source is activated when the cylinders are fully extended and remains activated or latched when the SCV is returned to neutral. It is deactivated or unlatched when the cylinders retracted.

Figure 2:
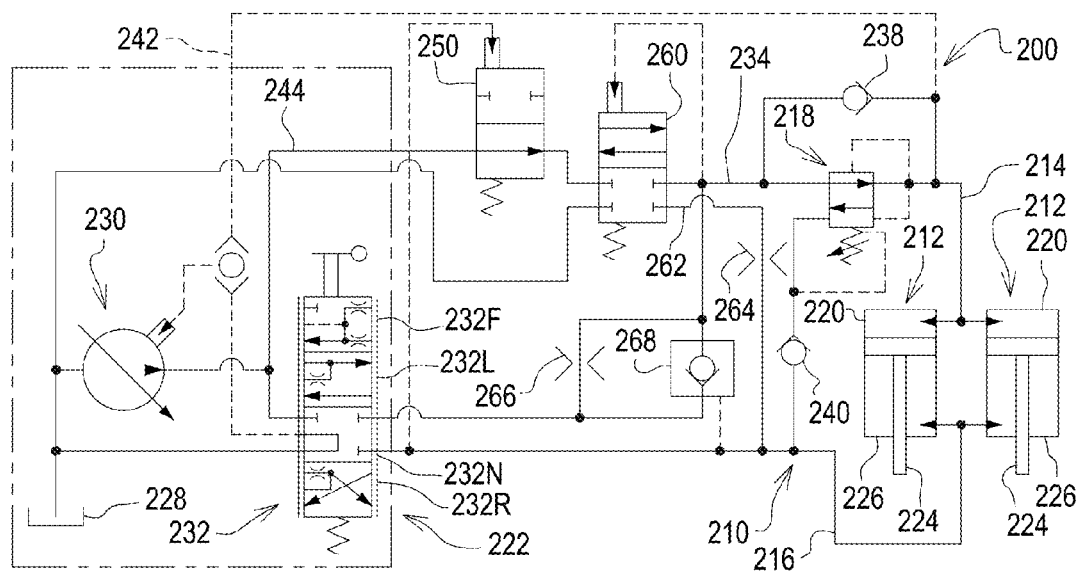
FIG. 2 is an exemplary hydraulic circuit diagram showing another implementation of the present invention.

An alternative circuit 200 is shown in FIG. 2. Here, elements similar or identical to elements in the circuit 100 are given reference numbers beginning with a 2 instead of a 1. Circuit 200 is similar to circuit 100 except the latching function is achieved by two single-pilot directional valves 250, 260 and an orifice 266 and a pilot-to-open check valve 268 are added for optimizing the circuit. A load sense controlled pump 230 provides flow to SCV 232 which controls the extending and retracting of cylinders 212. A pressure reducing/relieving valve 218 regulates the pressure delivered to the cap end 220 of the cylinders at all times. A return check valve 238 allows flow to bypass the pressure reducing/relieving valve 218 during cylinder retraction. A drain check valve 240 protects the pressure reducing/relieving valve during cylinder retraction.

A pilot operated, two-way, two-position, normally open, directional valve 250 and a pilot operated, four-way, two-position, normally closed, directional valve 260 provide the hydraulic latching function of the circuit. When the SCV extends the cylinders, oil flows freely through the pilot-to-open check valve 268 to the pressure reducing/relieving valve 218 and to the cap end of the cylinders. When the cylinders are fully extended, the cap end supply pressure increases. This pressure pilots the valve 260 open, connecting the power beyond pressure to the pressure reducing/relieving valve 218 and the power beyond return port to the cylinder retract circuit. When the SCV is returned to the neutral/closed position, the directional valves 250, 260, remain open, keeping the power beyond supply and return connected to the cylinders 212. The orifice 266 prevents the pilot pressure to the directional valve 260 from dropping too low during the SCV shift transition from the extend position to the neutral/closed position. This allows the cylinders to extend and retract as the external load on the tools require and as the down force pressure allows.

When the SCV is actuated to retract the cylinders, the orifice 264 prevents free flow of the supply oil through the directional valve 260 to the power beyond return. This allows the pressure in the retract circuit to build enough pilot pressure to close the directional valve 250. During cylinder retraction, the pilot-to-open check valve 268 allows free return of oil around the orifice 266 to the SCV return port. During cylinder retraction, the extend circuit is also connected to tank 228 which drops in the opening pilot pressure in the directional valve 260 allowing it to close, thus un-latching or turning off the power beyond supply and return from the down force circuit. When the SCV is moved to the float position, the four-way, two-position, directional valve 260 pilot pressure drops, allowing the valve to close. The orifice 266 can be used to prevent un-latching of the power beyond supply from the down force circuit when the SCV is in the float position. The orifice 266 and pilot-to-open check valve 268 may be added to circuit 100 to keep the active down force circuit engaged when in float.

Figure 3:
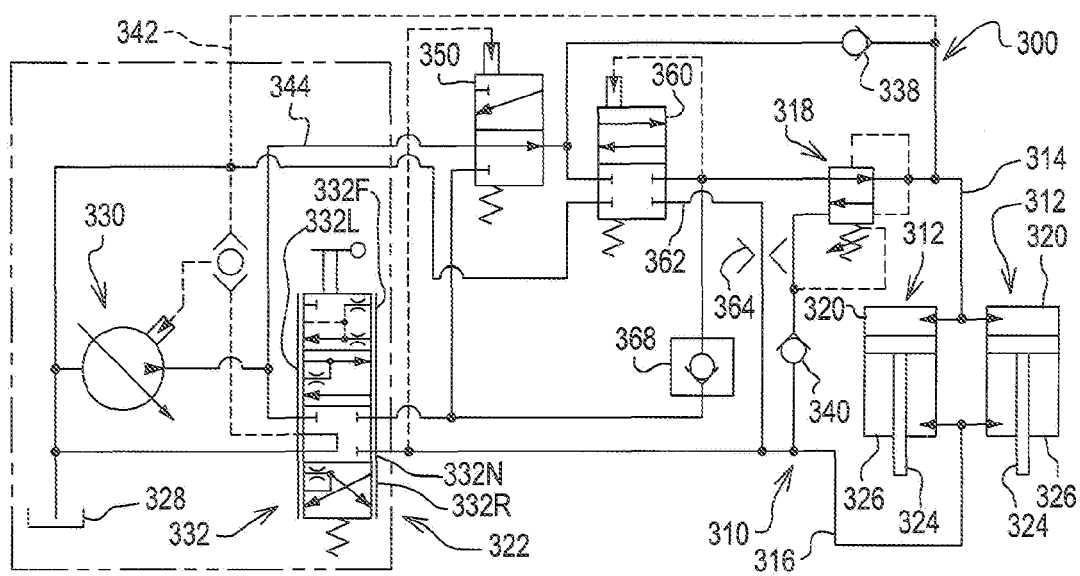
FIG. 3 is an exemplary hydraulic circuit diagram showing yet another implementation of the present invention.

With reference to FIG. 3, a third circuit 300 is shown. Circuit 300 is similar to circuit 200 except that the two-way, two-position, directional valve 250 of circuit 200 has been replaced by a three-way, two-position directional valve 350. Further, the orifice 266 and pilot-to-open check valve 268 have been replaced by a check valve 368. Lastly, the return check valve 338 has been routed around the directional valve 360. These changes synchronize the un-latching of the power beyond supply pressure with the cylinder 312 return oil during cylinder retraction.

It is a feature of the above hydraulic latching circuits that the regulated, load-sensed, power source is applied only when the cylinders have been extended, i.e., the tools have been lowered. Furthermore, when the circuit is hydraulically latched on, active down force is maintained with the SCV in the neutral/closed position. Additionally, only regulated pressure is applied to the cylinders so the tools are never lowered with pressure greater than the desired down force pressure. Finally, the cylinders and down force functions can be operated without the use of power beyond and load sensing by using the SCV down detent as historically done. This is useful when tractors without power beyond are used with the above circuits.

While the invention has been described in the context of an implement active down force system using cylinders connected to a rockshaft or directly connected to the implement tools, those skilled in the art will appreciate that the invention can be used in other applications involving use of a non-SCV controlled power beyond circuit in which latching of the circuit is desired by use of the SCV. The claims that follow are intended to be given this broad interpretation.

Having described the preferred embodiment, it will become apparent that various modifications can be made without departing from the scope of the invention as defined in the accompanying claims.

The invention claimed is:

1. An improvement in an active hydraulic down pressure system for an agricultural implement having down pressure cylinder structure and operable in an automatically controlled down pressure mode, the system adapted to be coupled to a source of hydraulic fluid under pressure through a multi-position selective control valve connected between the source and the down pressure system, the selective control valve having a neutral, a raise, a lower and a float position, the system also including:
   a cylinder structure,
   an adjustable pressure valve, having an input and an output, connected between the selective control valve and the cylinder structure for maintaining down pressure of the cylinder structure at a preselected level, and
   a fluid line connected to the fluid output on the source and to the input of the adjustable pressure valve, the fluid line providing a source of hydraulic fluid under pressure to the adjustable pressure valve independently of hydraulic fluid under pressure from the selective control valve so that the selective control valve is operable in the neutral position and the float position while the implement is operating in the automatically controlled down pressure mode, the improvement comprising:
      a load-sense line extending from the output of the adjustable pressure valve to the source of hydraulic fluid under pressure, and
      valve means in the fluid line for opening and closing the fluid line to fluid flow, the valve means including means operable to close the fluid line until the cylinder structure is extended and the valve means including means for opening the fluid line when the cylinder structure is extended and for maintaining the valve means in the open position when the selective control valve is returned to the neutral position whereby the system is operated in the automatically controlled down pressure mode with the selective control valve in the neutral position.

2. The system as defined in claim 1 wherein the valve means includes a normally closed first directional valve in the fluid line that is moved to an open position when the cylinder structure is extended to connect the source of hydraulic fluid under pressure to the adjustable pressure valve, the first directional valve being piloted to the open position by system pressure used to extend the cylinder structure, and
   a second directional valve between a rod end of the cylinder structure and a fluid tank, the second directional valve being normally closed and moved to an open position when the cylinder structure is extended, the second directional valve being piloted to the open position by system pressure used to extend the cylinder structure.

3. The system as defined by claim 2 wherein the first and second directional valves are each dual piloted valves with the pilot pressure to close the valves supplied by the system pressure used to retract the cylinder structure.

4. The system as defined in claim 1 wherein the valve means includes:
   a first directional valve in the fluid line, the first directional valve being normally open and moved to a closed position during the cylinder structure retraction, the first directional valve being piloted to the closed position by system pressure during cylinder structure retraction, and
   a normally closed second directional valve in the fluid line that is moved to an open position when the cylinder structure is extended to connect the source of hydraulic fluid under pressure to the adjustable pressure valve, the second directional valve being piloted to the open position by system pressure during cylinder structure extension.

5. The system as defined by claim 4 wherein the first directional valve is a two-way, two-position valve.

6. The system as defined by claim 4 wherein the second directional valve is a four-way, two-position valve.

7. The system as defined by claim 4 wherein the first directional valve is a three-way, two-position valve.

8. The system as defined by claim 4 further comprising a pilot-to-open check valve in the line connecting the selective control valve to the input of the adjustable pressure valve, the pilot-to-open check valve piloted by system pressure used to retract the cylinder structure.

9. In a hydraulic circuit having a load sense controlled pump, a selective control valve (SCV) through which the pump is connected to a load, and a non-SCV controlled connection of the pump to the load, the improvement comprising a load sense connection between the pump and the load external to the SCV and valve means for activating the load-sensed pump when the SCV is actuated from a neutral position to a first position and for maintaining the load-sensed pump activated when the SCV is returned to the neutral position.

10. The hydraulic circuit as defined by claim 9 wherein the load-sensed pump is deactivated when the SCV is later moved to a second position.

11. The system as defined in claim 9 wherein the valve means includes a normally closed first directional valve in the connection between the pump and the load external to the SCV, the first directional valve being moved to an open position when the SCV is moved to the first position to open the connection of the pump to the load, and
   a normally closed second directional valve in a return line from the load to a fluid tank, the second directional valve being moved to an open position when the SCV is moved to the first position.

12. The system as defined in claim 9 wherein the valve means includes:
   a normally open first directional valve in the connection between the pump and the load external to the SCV, the first directional valve being closed when the SCV is moved to the second position, and
   a normally closed second directional valve in the connection between the pump and the load external to the SCV, the second directional valve being moved to an open position when the SCV is moved to the first position.

* * * * *